(12) United States Patent
Pattiasina et al.

(10) Patent No.: US 11,752,748 B2
(45) Date of Patent: Sep. 12, 2023

(54) POLYMER COATING COMPOSITION FOR METAL SUBSTRATE AND USE THEREOF

(71) Applicant: TATA STEEL IJMUIDEN B.V., Velsen-Noord (NL)

(72) Inventors: Johannes Willem Pattiasina, Velserbroek (NL); Jan Paul Penning, The Hague (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 87 days.

(21) Appl. No.: 16/977,671

(22) PCT Filed: Apr. 23, 2019

(86) PCT No.: PCT/EP2019/060298
§ 371 (c)(1),
(2) Date: Sep. 2, 2020

(87) PCT Pub. No.: WO2019/211117
PCT Pub. Date: Nov. 7, 2019

(65) Prior Publication Data
US 2021/0039370 A1 Feb. 11, 2021

(30) Foreign Application Priority Data

Apr. 30, 2018 (EP) ........................................ 8170149

(51) Int. Cl.
*B32B 27/36* (2006.01)
*B29C 48/00* (2019.01)
(Continued)

(52) U.S. Cl.
CPC .......... *B32B 27/36* (2013.01); *B29C 48/0018* (2019.02); *B29C 55/045* (2013.01);
(Continued)

(58) Field of Classification Search
None
See application file for complete search history.

(56) References Cited

U.S. PATENT DOCUMENTS

| | | | |
|---|---|---|---|
| 5,093,208 A * | 3/1992 | Heyes | B32B 15/08 428/458 |
| 2007/0031688 A1* | 2/2007 | Suzuki | B32B 15/08 428/458 |
| 2014/0072742 A1 | 3/2014 | Penning et al. | |

FOREIGN PATENT DOCUMENTS

| | | |
|---|---|---|
| EP | 0576682 A1 | 1/1994 |
| EP | 0685509 A1 | 12/1995 |

(Continued)

OTHER PUBLICATIONS

Sumida—JP H09-85917 A—MT—amorphous layer between PBT and metal—1997 (Year: 1997).*

(Continued)

*Primary Examiner* — John Vincent Lawler
(74) *Attorney, Agent, or Firm* — Vorys, Sater, Seymour and Pease LLP

(57) ABSTRACT

A polymer film for laminating onto a metal substrate (M), the polymer film including an adhesion layer (A) and a bulk layer (B), wherein the adhesion layer is intended for bonding to the metal substrate and includes 20 to 50 wt. % of a non-crystallisable copolyester, 50 to 80 wt. % of polybutylene terephthalate (PBT) and 0-10 wt. % of polymers and additives, and wherein the bulk layer consists of is at least 91 wt. % of PBT and at most 9% of other polymers and additives.

20 Claims, 4 Drawing Sheets

(51) Int. Cl.
  *B29C 55/04* (2006.01)
  *B29C 55/08* (2006.01)
  *B32B 7/12* (2006.01)
  *B32B 15/09* (2006.01)
  *B32B 27/18* (2006.01)
  *B29K 67/00* (2006.01)

(52) U.S. Cl.
  CPC ............... *B29C 55/08* (2013.01); *B32B 7/12* (2013.01); *B32B 15/09* (2013.01); *B32B 27/18* (2013.01); *B29K 2067/006* (2013.01); *B32B 2250/244* (2013.01); *B32B 2270/00* (2013.01); *B32B 2307/752* (2013.01); *B32B 2439/66* (2013.01); *B32B 2439/70* (2013.01)

(56) References Cited

FOREIGN PATENT DOCUMENTS

| EP | 1186633 | A2 | 3/2002 | | |
| EP | 1690675 | A1 | 8/2006 | | |
| EP | 2625319 | | 4/2012 | | |
| EP | 3011080 | | 12/2014 | | |
| EP | 3 251 834 | A1 | 12/2017 | | |
| JP | 6-39979 | A | 2/1994 | | |
| JP | H09/85917 | | * 3/1997 | ............. | B32B 15/09 |
| JP | 2001001447 | A | 1/2001 | | |
| JP | 2001/150621 | | * 6/2001 | ............. | B32B 15/09 |
| JP | 2002178471 | A | 6/2002 | | |
| JP | 2002338709 | A | 11/2002 | | |
| JP | 2002355926 | A | 12/2002 | | |
| JP | 2006095892 | A | 4/2006 | | |
| JP | 2009/255391 | | * 11/2009 | ............. | B32B 15/08 |
| JP | 2010094890 | A | 4/2010 | | |
| JP | 2014518781 | A | 8/2014 | | |
| WO | WO-2018025058 | A1 | * 2/2018 | ............. | B32B 15/09 |

OTHER PUBLICATIONS

Inui—JP 2001-150621 A—MT—polyester film formetai laminate—2001 (Year: 2001).*
Ebiya—JP 2009-255391 A—MT—PBT layer + amorphous layers—2009 (Year: 2009).*
Turner—amorphous copolyesters—J.Poly.Sci. A—2004 (Year: 2004).*
International Search Report and Written Opinion dated Jul. 16, 2019 for PCT/EP2019/060298 to Tata Steel Ijmuiden B.V. filed Apr. 23, 2019.
Translation of Jan. 6, 2023 Office action for Japanese patent application No. 2020-560772.

* cited by examiner

POLYMER COATING COMPOSITION FOR METAL SUBSTRATE AND USE THEREOF

This invention relates to a polymer coating composition for coating a metal substrate, and in particular for coating a packaging steel substrate, and use thereof.

Polymer coil-coated packaging steels are attracting more and more attention. Advantages compared to sheet and coil lacquered systems include the absence of volatile organic compounds (VOC's) on coating application, the consistent quality of the application process and the absence of food legislation issues of the product. Tata Steel has been supplying polymer coated packaging steel (Protact®) since 2000. The products are mainly positioned in the food markets (ends, deep-drawn cans, 2-piece cans) and the most frequently applied polymer coatings are PET and PP. Achieving adhesion of such a polymer coating to a steel substrate is considered to be amongst the most difficult tasks in the process. On previous occasions, it has been shown that adhesion can be established by using (chemically) modified PET and PP resins. However, on processing of the polymer strip in the can making and food industries, the product is frequently subjected to highly demanding treatments such as forming (deep-drawing or wall ironing), thermal printing and sterilisation.

Polyester films of various compositions are commonly laminated onto the can metal surface to provide a protective barrier against corrosive environmental conditions. These barrier films are usually laminated onto both sides of the metal so that the inner and outer side metal surfaces of the container are protected from degradation by the contained material and the external ambient environment, respectively. In the case of food containers, after containers are filled, they are exposed to a retort process that typically involves contacting a surface with live steam for a period of time to sterilize the can and pasteurize or partially cook the contents. Live steam means that steam directly contacts the surface of the container. The steam is usually superheated, i.e. above the boiling point of water. The polymer coated container must be able to withstand these conditions.

Retort processing of plastic laminated metal containers can adversely affect the quality of the container. An area of particular interest is a visually observable defect on the outer side of metal containers that manifests as discoloured or cloudy spots or areas. In the canning industry, this defect is known as "blushing". Much attention has been given to prevention of blushing. Blushing is whitening of transparent coatings during heat treatments such as sterilisation or pasteurisation. In polyester coated metal substrates this phenomenon is believed to be related to crystallisation of the initially amorphous polyester coating during such heat treatments.

A preferred polymer film composition for polymer coating of packaging material is polyethylene terephthalate ("PET"). This material is susceptible to blushing. One of the most common methods to improve blush resistance of a polymer film relies on blending polybutylene terephthalate ("PBT") with PET in at least the outermost surface of the polymer film. The outermost surface of the polymer film will also be the outermost surface after lamination onto a metal substrate.

It is known that the problem of blushing can be effectively solved by adding up to 60% PBT to the coating formulation (see EP0576682-A1, EP0685509-A1 and EP1690675-A1). EP1186633-A2 discloses polyester films made from a polyester resin composition comprising 10-70 wt. % of PET and 90-30 wt. % of PBT. However, this blend suffers from the transesterification between PET and PBT, thereby losing the beneficial effects of the individual components. The problem of transesterification can be solved by adding a phosphorous containing compound that inhibits the transesterification as in EP1186633.

Unfortunately, due to this crystalline nature of PBT, adhesion to a metal substrate is poor. Also, when laminating a film, in particular a stretched film, onto a metal substrate the laminating process may be very difficult to perform, because the film does not stick to the metal substrate unless the metal substrate is pre-heated to a high temperature, e.g. at or above the melting point of PBT (≈223° C.).

It is the object of the invention to provide a polymer film with excellent adhesion to a metal substrate after heat bonding to, or direct extrusion onto, the metal substrate, while simultaneously providing excellent anti-blushing properties.

The object is reached with a process according to claim 1. Preferable embodiments are provided in the dependent claims.

The inventors found that by increasing the amount of PBT in the coating formulation, a better and more robust non-blushing performance is obtained. In the course of the research into this topic, the inventors found that using substantially pure (homopolymer) PBT, rather than the PET/PBT blend of the prior art, gives a superior result. The use of pure PBT as coating has further advantage over the use of PET/PBT blends. For example there is no danger of transesterification reactions, and consequently the compounds needed to prevent this are also no longer needed. PBT is a polymer that crystallises very fast, resulting in very fine crystallites that do not scatter visible light when provided in the form of a thin film or coating. Due to the crystalline structure, PBT does not undergo substantial additional crystallisation, produce coarse crystals or absorb significant amounts of water when heated in moist conditions to temperatures suitable for crystallisation. Hence, PBT films and coatings provide excellent blushing resistance, for instance during a sterilisation, process.

The problem of poor adhesion of the polymer film with a very high PBT content is solved according to the invention by using an adhesion layer consisting of 20 to 50 wt. % of a non-crystallisable copolyester, 80 to 50 wt. % of PBT and optionally 0-10 wt. % of other polymers and additives. In the context of this invention a non-crystallising copolyester means a copolyester that crystallises very slowly, i.e. not in the timeframe of the heat treatments, or does not crystallise at all. Whether or not a copolyester crystallises or not can be determined relatively simply by thermal analysis. By heating the resin material in a differential scanning calorimeter at a heating rate of 10° C./min and verifying the absence of any endothermic melting peaks in the temperature range from 180 to 280° C. it can be determined that there no crystallisation was present. The presumption is that if a melting peak is observed, then there was a crystalline phase, and if there is a crystalline phase, then the polymer is crystallisable (see FIG. 4a-4c for examples).

Adding such a non-crystallisable copolymer to the adhesion layer disrupts the crystalline structure of PBT thus enabling sticking to a metal substrate during lamination and provides long-term adhesion during the use of the polymer-coated material in various applications.

It is essential however that the non-crystallisable copolyester is added only to the adhesion layer contacting the metal substrate.

If the non-crystallisable copolyester is added to other layers or to all layers of the film in the amount to be effective to improve adhesion (20-50 wt. %), then the blushing resistance of the coating is deteriorated. Also, when the non-crystallisable copolyester is added to the adhesion layer contacting the metal substrate only, the amount of copolyester in the adhesion layer should not be too high because in that case, again, the blushing resistance of the coating or film is deteriorated. By means of experimental investigation the inventors found that if the amount of non-crystallisable copolyester in the adhesion layer is more than 50 wt. %, the blushing resistance of the coating is deteriorated to such an extent that it is no longer acceptable. If the amount of non-crystallisable copolyester in the adhesion layer is less than 20 wt. %, the improvement of the adhesion adhesion of the coating to the metal substrate is deteriorated to such an extent that it is no longer acceptable.

The adhesion layer may optionally contain 0-10 wt. % of other polymers and additives. These additives are common additives such as release agents, lubricants or anti-block-agents, etc. These additives are usually added to the polymer in the form of a masterbatch containing these additions. If appropriate, a release agent and/or an anti-blocking agent is added as an additive to the top and/or the adhesion layer of the film to enable proper film coiling and uncoiling of the film line after producing the film. Since the additive agent is added in the form of a polyester-based masterbatch, this also has a small effect on the overall PBT content in the film if the polyester base of the masterbatch is PET. Masterbatches containing the aforementioned additives agent in a PET carrier resin are commercially available. The addition of this masterbatch to the adhesion layer therefore also implies the addition of small amounts of PET. These small amounts were not found to have a significant effect on the adhesion or blushing characteristics of the adhesion layer, provided the addition of non-crystallisable copolyester is in the claimed range. However, it is preferable to keep the amount of other polymers beside the non-crystallisable copolyester and the PBT to a minimum.

DETAILED DESCRIPTION

Figure 1:
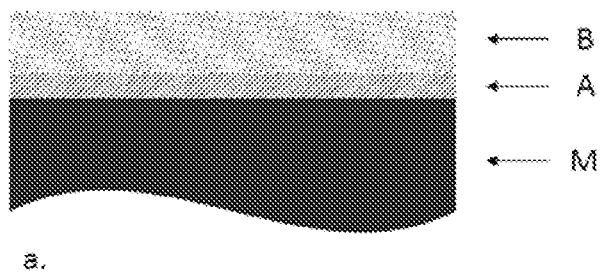
FIG. 1a shows two sublayers in the coating, an adhesion layer and a bulk layer.
FIG. 1b shows an additional top layer "T" on top of the bulk layer.
FIG. 1c shows an additional layer "X" on top of the top layer.
FIG. 1d shows an additional layer "X" between the top layer and the bulk layer.
Figure 1:
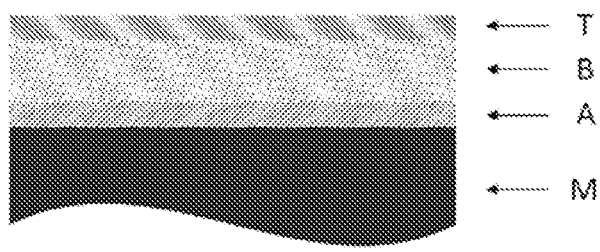
Figure 1:
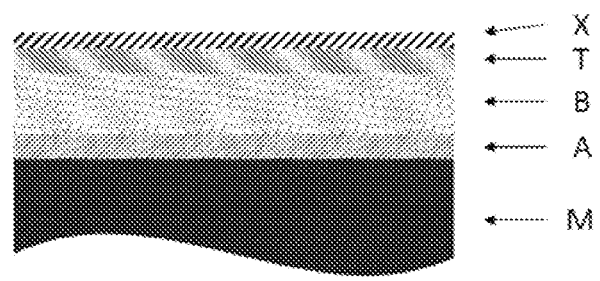
Figure 1:
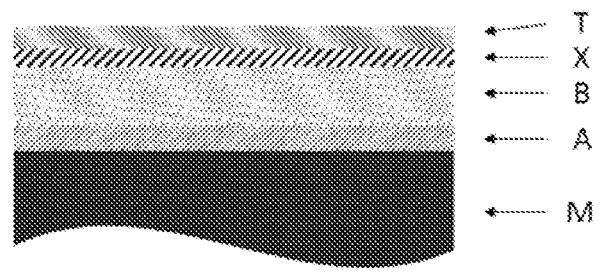

In an embodiment the adhesion layer contains at least 25 wt. % of non-crystallisable copolyester, preferably at least 30 wt. %. In an embodiment the adhesion layer contains at most 45 wt. % of non-crystallisable copolyester.

In an embodiment the polymer film consists of two layers wherein also an adhesion layer and a bulk layer (B) is provided, wherein the bulk layer consists of at least 91 wt. % of PBT, and at most 9% of other polymers and additives. Preferably the bulk layer consists of at least 95 wt. % of PBT, and at most 5% of other polymers and additives, more preferably the bulk layer consists of at least 99 wt. % of PBT, and at most 1% of other polymers and additives.

In another embodiment the polymer film consists of three layers wherein also a top layer (T) on top of the bulk layer (B) is provided, wherein the bulk layer consists of at least 91 wt. % of PBT, and at most 9% of other polymers and additives. Preferably the bulk layer consists of at least 95 wt. % of PBT, and at most 5% of other polymers and additives, more preferably the bulk layer consists of at least 99 wt. % of PBT, and at most 1% of other polymers and additives.

In the embodiment wherein the polymer film consists of three layers the top layer (T) consists of at least 91 wt. % of PBT, and at most 9% of other polymers and additives. Preferably the top layer consists of at least 95 wt. % of PBT, and at most 5% of other polymers and additives, more preferably the top layer consists of at least 99 wt. % of PBT, and at most 1% of other polymers and additives.

In an embodiment the total PBT content in the polymer film is at least 88 wt. %, preferably at least 90 wt. %. If the total PBT content in the polymer film is too low, then the blushing performance is inadequate.

In an embodiment the total PBT content in the polymer film is at most 99 wt. %, preferably at most 98 wt. %, more preferably at most 96 wt. %, even more preferably at most 95 wt. %. Below this upper boundary the adhesion of the polymer film improves further, while maintaining the blushing performance at a good level.

In an embodiment the thickness of the adhesion layer is between 2 and 8 μm.

In an embodiment wherein the total film thickness is between 10 and 50 μm, preferably between 12 and 40 μm and more preferably between 15 and 35 μm In a preferable embodiment wherein the non-crystallisable polyester is PETg.

In an embodiment the non-crystallisable polyester is IPA-PET. Preferably the amount of IPA in the IPA-PET is at least 20%, more preferably at least 25%. A suitable IPA PET has about 30% IPA.

In an embodiment the polymer film comprises one or more polymer layers in addition to the top, bulk and adhesion layer.

According to a second aspect the invention is also embodied in a process for producing a polymer film according to the invention comprising the steps of:
melting a suitable mixture of polymer granules in two or more extruders;
passing the molten polymer through a flat extrusion die to form the polymer film consisting of the said two or more layers;
cooling the extruded polymer film using one or more cooling, casting or calendering rolls to form a solid polymer film;
trimming the edges of the extruded polymer film;
reducing the thickness of the solid polymer film by stretching the solid polymer film in a stretching unit by exerting a stretching force only in the longitudinal direction (MDO), or only in the transverse direction (TDO), or biaxially (BO);
optionally trimming the edges of the stretched polymer film;
optionally coiling the stretched polymer film.

This method allows the production of the film, which can subsequently be laminated onto a metal substrate (M), either immediately following the stretching and optional trimming, or after the optional coiling.

According to a third aspect the invention is also embodied in the use of the polymer film according to the invention to produce a laminate by laminating the polymer film onto one or both sides of a heated metal substrate (M) by (i) laminating the stretched polymer film onto the metal substrate by passing the metal substrate and the polymer film(s) through a laminating device and heat bonding the polymer film to the metal substrate to produce a polymer-coated substrate followed by post-heating the polymer-coated substrate to reduce the orientation and crystallinity of the polymer film, and subsequently cooling, preferably fast cooling or quenching, the post-heated polymer-coated substrate or by (ii) cast film lamination ("direct extrusion") onto the metal substrate (M), followed by cooling, preferably fast cooling or quenching, the polymer-coated substrate.

The laminate may be provided with a polymer film according to the invention on both sides, or it may be provided with a polymer film according to the invention on one side only and a different polymer film on the other side.

According to a fourth aspect the invention is also embodied in the laminate consisting of a metal substrate laminated with the polymer film according to the invention for use in the production of containers or container parts for packaging food or beverages for human or animal consumption on one or both sides of the metal substrates. The container parts may, for example, be lids for 2-piece cans, or lids and bottoms for 3-piece cans.

In an embodiment the roughness of the laminate expressed as Ra value, averaged over rolling and transverse directions, is 0.19 μm or lower, preferably 0.18 or lower.

The invention will now be further explained by means of the following, non-limiting examples.

Films having A/B and A/B/T layer structure were produced by cast film lamination or by casting a film and stretching it (MDO) before laminating the film onto the polymer substrate by lamination, employing different film compositions. The total film thickness was 15 μm, with an adhesion layer (A) of 3 μm, a bulk layer (B) of 9 μm and top layer (T) of 3 μm. The adhesion layer (A) was 3 μm and the bulk layer (B) was 12 μm for the 2 layer systems (D2S-2 and D3S-2). The bulk layer is also the top layer for these 2 layer systems. The polymer films were laminated on a preheated metal substrate (in this case continuously annealed 0.18 mm ECCS Temper 67 (HR30T=67) low-carbon steel) and heat bonded thereto. The steel substrate is not critical and any metal substrate, and in particular any steel substrate suitable for packaging applications can be used. The substrate may be provided with a metal coating such as (but not limited to) a chromium coating (as in ECCS or the like) or FeSn (as in EP2625319) or chromium-chromium-oxide (as in TCCT® in EP3011080). After laminating the polymer films of table 1 onto one side of the metal strip and a 15 μm clear film containing a heat-sealable layer on one side of the film (Mitsubishi Hostaphan® RHST15 (PET)) on the other side the resulting laminate was postheated to melt the polymer films and was immediately quenched.

TABLE 1

Film recipes for PBT films with PETg-modified adhesion layers (NCP (non-crystallising polyester), PBT, A (additives) and PBT_total in wt. %).

| | adhesion layer | | | bulk layer | top layer | | PBT_total | | | |
|---|---|---|---|---|---|---|---|---|---|---|
| | NCP | PBT | A | PBT/RA | PBT | A | wt. % | Adhesion | Blushing | Proc. |
| D2S | 30 | 68 | 2 | 100/0* | 98 | 2 | 93.2 | + | + | FL |
| D3S | 45 | 53 | 2 | 100/0* | 98 | 2 | 90.2 | + | + | FL |
| D2S-2 | 30 | 68 | 2 | 100/0** | — | — | 93.6 | + | + | FL |
| D2S-2a | 30 | 68 | 2 | 98/2** | — | — | 92 | + | + | FL |
| D2S-3 | 45 | 53 | 2 | 100/0** | — | — | 90.6 | + | + | FL |
| D1S# | 0 | 98 | 2 | 100/0* | 98 | 2 | 99.2 | − | + | FL |
| D4S# | 70 | 28 | 2 | 100/0* | 98 | 2 | 85.2 | + | − | FL |
| 292-8# | 65 | 35 | 0 | 100/0* | 100 | 0 | 87 | + | − | CFL |
| 292-9# | 0 | 100 | 0 | 100/0* | 90/9+ | 1 | 98 | − | + | CFL |
| PET# | Mitsubishi Hostaphan ® RHST15 (PET) | | | | | | 0 | + | − | FL |

*12 μm,
**15 μm,
+: 90 wt. % PBT, 9 wt. % PET,
comparative example.
PBT—Valox 315 from SABIC Innovative Plastics; NCP (PETg)—Eastar 6763 from Eastman Chemical Co.; A Masterbatch on PET-basis containing additives (such as release agent, anti-block agent) T dc S258 by Sukano AG.
FL: Film lamination of MDO polymer film (EP0312302); CFL: cast film lamination (EP1019248).

The column "adhesion" in Table 1 shows the summary results of the adhesion as determined with the "cross-cut" of "cross-hatch" (German: Gitterschnitt, GT) method as described in ISO 2409:1992, $2^{nd}$ edition. The cross-cut test was performed using a cutting tool (Erichsen Model 295) consisting of four edges each spaced 5 mm apart (4×5 mm geometry) that was mounted on a motor-driven apparatus. A "−" means that the adhesion is unsatisfactory. Table 2 shows detailed results of several samples. Adhesion performance was tested on flat and deformed (Erichsen dome) material after sterilisation in a) demi-water and b) bone broth, for 90 min at 121° C.

The adhesion performance of the different coatings after sterilisation in demi-water and in a bone broth is summarised in Table 2. As can be seen, the coating adhesion of the pure PBT coatings is dramatically improved with the addition of PETg as non-crystallisable copolyester to the adhesion layer. Even the lowest amount of 30% PETg is effective in restoring adhesion. A value of GT 5 means that more than 65% of the surface is affected. A value of 1 means that less than 5% is affected. 0 means no detachment.

TABLE 2

Coating adhesion after sterilisation of flat and deformed material

| | | Demi-water 121° C. 90 min. | | BB* 121° C. 90 min | |
|---|---|---|---|---|---|
| Coating | NCP in A | Flat | Dome 5 mm | Flat | Dome 5 mm |
| D1S | 0% | GT 5/5/5 | GT 5/5/5 | GT 5/5/5 | GT 5/5/5 |
| D2S | 30% | GT 1/1/1 | GT 0/0/0 | GT 1/1/1 | GT 0/0/0 |

TABLE 2-continued

Coating adhesion after sterilisation of flat and deformed material

| Coating | NCP in A | Demi-water 121° C. 90 min. | | BB* 121° C. 90 min | |
|---|---|---|---|---|---|
| | | Flat | Dome 5 mm | Flat | Dome 5 mm |
| D3S | 45% | GT 1/1/1 | GT 0/0/0 | GT 1/1/1 | GT 0/0/0 |
| D4S | 70% | GT 0/0/0 | GT 0/0/0 | GT 0/0/0 | GT 0/0/0 |

*Bone broth

The column "blushing" shows the results of the blushing test. A "+" in Table 1 means that the blushing performance is satisfactory (no or no significant blushing).

Blushing performance was evaluated as follows (see also FIG. 3 and the description thereof). In this test, a flat sample of polymer coated metal substrate is placed on top of an open cylinder connected to a pan of generously boiling water, so that the sample covers the open cylinder and so that steam impinges on the sample within the well-defined area inside the cylinder. The test is run during 15 min., after which the material is visually inspected for signs of whitening discolouration. FIG. 3 shows the schematic set-up. A pressure cooker type pan (2) filled with water is brought to a generous boil by means of hot-plate (1) so that steam is generated. The pan is provided with a lid (3) which has a small hole in the middle where the steam escapes from the pan. On top of the lid, covering the hole, there is an open cylindrical adapter (4) of 75 mm in diameter and 50 mm in height. A flat sample of polymer-coated material (5) of 12×12 cm dimensions is placed on top of the cylindrical adapter and held in place with e.g. a small weight and simulates the effect of the steam during retorting. Steam from the boiling water impinges on the test sample on the area enclosed by the cylindrical adapter. The ring where the sample touches the open ring is clearly visible, e.g. in FIG. 2, bottom right image, and the degree of blushing is determined in the circle. This method is very much a qualitative measure, but it allows to compare different polymer coated samples quickly, easily, and in a way representative to a retort operation.

The PBT is obtained by polycondensation of a terephthalic acid component (preferably 80-100%, more preferably 90-100%), and a 1,4-butanediol component as main components (preferably 80-100%, more preferably 90-100%), with or without sequential solid-state polycondensation. It has repeating butylene terephthalate structure, shows high crystallinity, has high crystallisation speed and low Tg, and therefore, is suitable for can forming. The PBT preferably has the following properties: an intrinsic viscosity of preferably 0.60-2.2, more preferably 1.0-1.5, a weight-average molecular weight of preferably 50000-200000, more preferably 80000-150000, and a distribution of molecular weight, which is a ratio of weight-average molecular weight to number-average molecular weight, of preferably 1.5-5.0, more preferably 1.5-2.5 ($D=M_w/M_n$).

In addition to pure (homopolymer) PET, PET modified by copolymerisation is also available. In some cases, the modified properties of copolymer are more desirable for a particular application. For example, cyclohexane dimethanol (CHDM) can be added to the polymer backbone in place of ethylene glycol (EG). Since this building block is much larger (6 additional carbon atoms) than the ethylene glycol unit it replaces, it does not fit in with the neighbouring chains the way an ethylene glycol unit would. This interferes with crystallisation. In general, such PET is known as PETg or PET-G (Polyethylene terephthalate glycol-modified). Eastman Chemical, SK Chemicals and Selenis are some PETg manufacturers. Although the use of CHDM in the context of this invention is preferable, examples of other comonomers that can be used to produce PETg and achieve obtain a non-crystallising PETg are 2,2,4,4-Tetramethyl-1,3-cyclobutanediol or 1,4:3,6-Dianhydro-D-glucitol (isosorbide).

Another common modifier is isophthalic acid, replacing some of the 1,4-(para-) linked terephthalate units. Replacing terephthalic acid with isophthalic acid creates a kink in the PET chain, interfering with crystallisation and lowering the polymer's melting point. The 1,2-(ortho-) or 1,3-(meta-) linkage produces an angle in the chain, which also disturbs crystallinity. These copolyesters are generally referred to as IPA-PET, A-PET or PETA (Polyethylene terephthalate acid-modified) and are also non-crystallising polyesters that can be used in the polymer films according to the invention, such as IPA-PET with 30% IPA.

According to the invention the polymer film contains at least two layers: The layer contacting the metal substrate ("adhesion layer") contains a copolyester resin in an amount of 20-50 wt. % and PBT in an amount of 50-80 wt. % and optionally other polymers and additives in an amount of 0-10 wt. %. The copolyester resin has the property that it is non-crystallisable. An example of a suitable copolyester is glycol-modified polyester PETg, such as commercially available Eastar Copolyester 6763 from Eastman Chemical Co. or Skygreen S2008 from SK Chemicals. Also, IPA-modified polyester resins may be used of the amount of IPA modification is sufficiently high to ensure the IPA-PET is non-crystallisable. Whether or not the polyester is non-crystallisable can be determined as described above.

The non-crystallising PETg used in the present invention has TPA as diacid component and a mixture of EG and CHDM as diol component in which the latter represents about 30 wt. % of the diol component.

The one or more layers on top of the adhesion layer consist essentially of PBT. Examples of suitable PBT resins are Crastin FG6129 by DuPont, Valox 315 by SABIC, Pocan B1600 by Lanxess or Ultradur B4500 FC by BASF. Certain minor amounts of additives may be used in the upper layers, such as antiblock or release additives which can be added in the form of additive masterbatches. Therefore the upper layers consist of PBT in an amount of 91-100 wt. % and other polymers and additives in an amount of 0-9 wt. %.

In case of three or more layers the bulk layer consists substantially of PBT, and it has to be understood that this means that insignificant amounts of other compounds may be present that do not significantly affect the favourable properties of PBT.

The coating composition can be applied to a metal substrate in various forms and by various methods, which is not restricted. For instance, the coating composition can be applied to the metal substrate by a process of multi-layer extrusion coating.

The composition can also be provided in the form of a pre-fabricated polymer film that is made by multi-layer extrusion and casting, optionally followed by stretching in one or two directions. Thus, the coating composition is provided as an unoriented cast film, a machine direction oriented (MDO) film, a transverse direction oriented (TDO) film or a biaxially oriented (BO) film. The pre-fabricated film is then laminated to the metal substrate by unwinding the film, transporting the film to a laminating nip and laminating the film to the metal substrate.

The thickness of the coating is not particularly restricted but will be optimised between cost and functionality. Typically total polymer film thickness is between 10 and 50 μm, preferably between 12 and 40 μm and more preferably between 15 and 35 μm. The thickness of the adhesion layer is typically between 2 and 8 μm, preferably between 3 and 6 μm. The minimum number of sublayers in the coating is two, an adhesion layer and a bulk layer (see FIG. 1a), and in use the adhesion layer is positioned between the metal substrate and the bulk layer. More preferred is a three layer coating consisting of an adhesion layer A, a bulk layer B and a top layer T (see FIG. 1b), where the B and T layers consist of PBT in an amount of 91-100 wt. %, but do not necessarily have the same composition. For example, the B layer may consist of 100 wt. % of PBT, while the top layer consists of 95-100 wt. % of PBT and 0-5 wt. % of a masterbatch containing an antiblock or release agent additive. In use the adhesion layer is positioned between the metal substrate and the bulk layer, and the top layer is positioned on top of the bulk layer. Additional layers may be present beside the A-, B- and T-layer. FIG. 1c shows an additional layer "X" on top of the top layer, and FIG. 1d shows an additional layer "X" between the top layer and the bulk layer. These (and other) additional layers may be used if certain specific functionality is needed that cannot be provided by the layers already present according to the invention.

The adhesion layer shows different amounts of added PETg, which is the non-crystallisable copolymer in this example. Example D1S contained no PETg, D2S to D4S contained 30 wt. %, 45 wt. % and 70 wt. % respectively. The remainder of the adhesion layer consisted of PBT and 2 wt. % of the same release agent masterbatch as in the top layer. The presence of the release agent in one or both layers of the A and T is important for the windability of the polymer film after casting and stretching. As soon as the polymer film is laminated onto a substrate, the release agent in the adhesion layer has no further particular function, whereas the release agent in the top layer is beneficial for product release (if the polymer film is used for the inside of a can).

Figure 2:
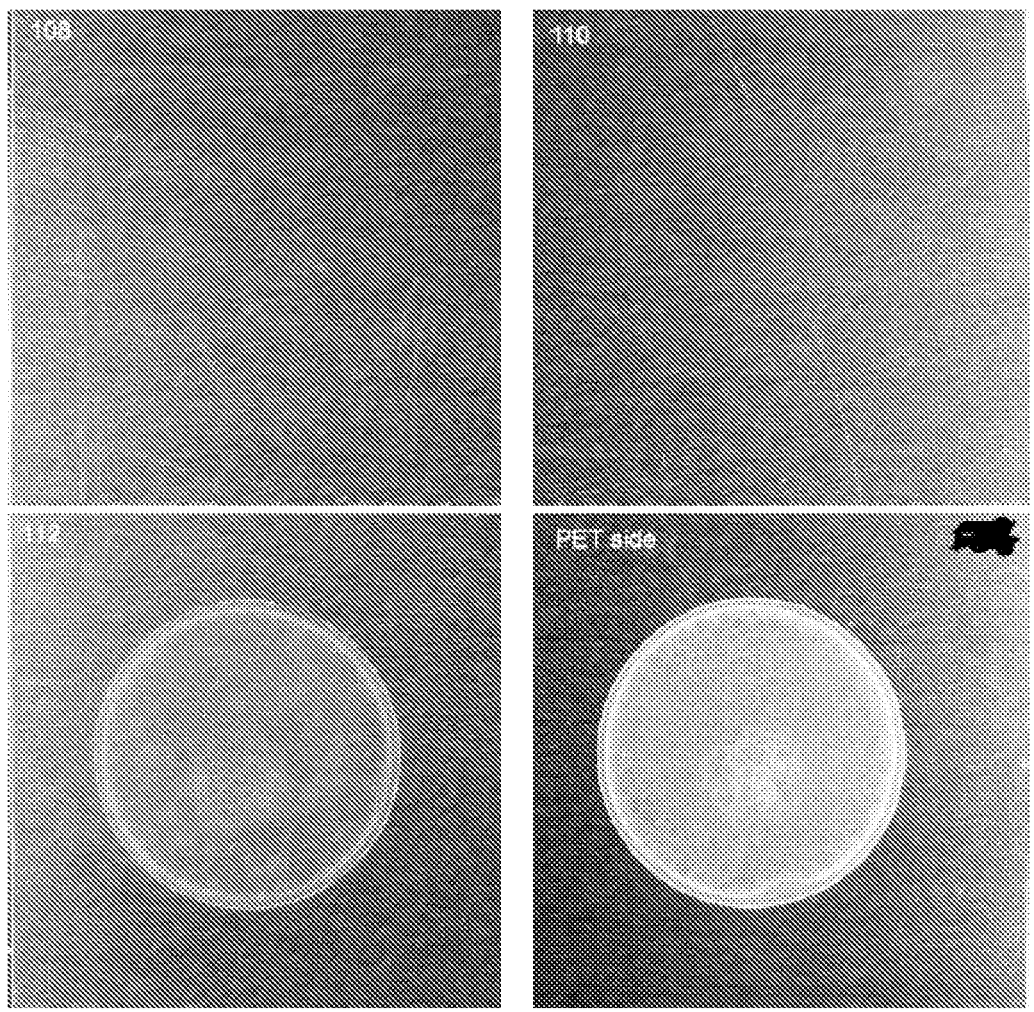
FIG. 2 shows test panels after exposure to steam in the bespoke blushing test.
Figure 3:
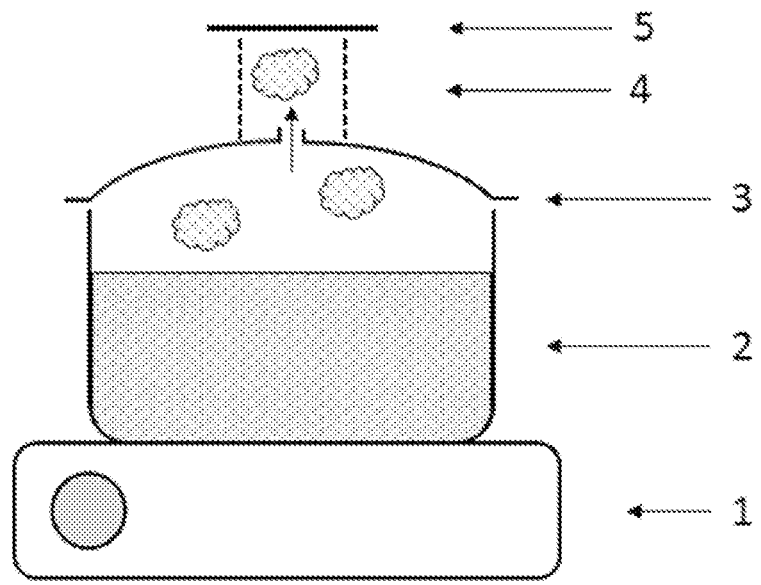
FIG. 3 shows the schematic set-up.

In FIG. 2, test panels after exposure to steam in the bespoke blushing test are shown. In material D2S (top left) (30% PETg adhesion layer) no blushing is observed at all while in material D3S (top right) (45% adhesion layer) only a very light blushing is observed—the effect is more pronounced in the photograph than it is to the eye. This level of blushing is considered acceptable. In material D4S (bottom left)(70% PETg adhesion layer) blushing can be observed quite clearly, and this is not acceptable. Finally, the backside of the material, coated with Mitsubishi RHST15 film, was also exposed to the test as PET reference material. In this case, very pronounced blushing is observed. The results clearly demonstrate that PETg in the adhesion layer has a negative effect on the blushing performance of PBT coatings, but this effect is negligible when the amount of PETg remains below 50%.

The laminate produced according to the invention is postheated and cooled after providing the polymer film according to the invention onto the metal substrate. This postheating and cooling affects (reduces) the roughness of the laminate. Surface roughness of the as-received materials was determined using the BMT Expert system equipped with a 2 μm radius skidless tip, operated at 0.5 mm/s traverse speed. Measuring length and cut-off value were set to 2.4 mm and 0.8 mm, respectively, in accordance with JIS B 0601:2001. The roughness profile was determined parallel and perpendicular to the steel substrate rolling direction, three times for a given sample, and the arithmetic mean roughness Ra values from each of these six measurements was averaged. The Ra values, averaged over rolling and transverse directions, are in all cases below 0.20 μm (Table 3).

TABLE 3

Surface roughness in rolling direction (RD) and transverse direction (TD), and average value expressed as arithmetic mean roughness Ra.

| Sample | RD (μm) | TD (μm) | Average (μm) |
|--------|---------|---------|--------------|
| D2S    | 0.08    | 0.19    | 0.13         |
| D3S    | 0.12    | 0.19    | 0.15         |
| D4S    | 0.12    | 0.20    | 0.16         |

Figure 4A:
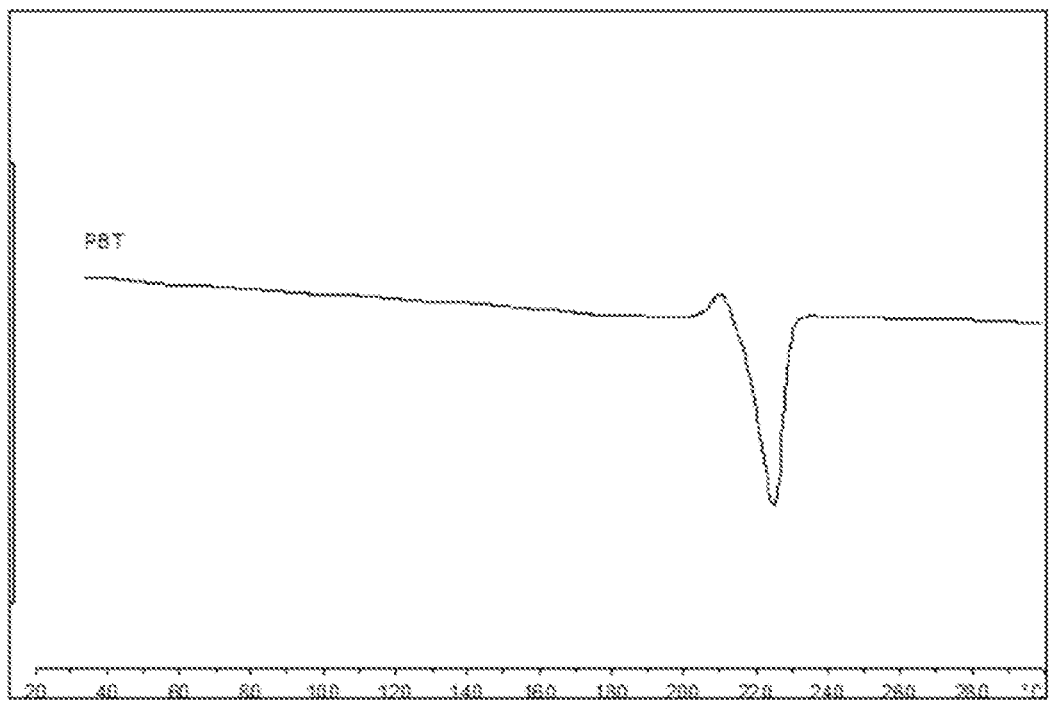
FIG. 4a, FIG. 4b and FIG. 4c show examples of thermal analysis tests.
Figure 4B:
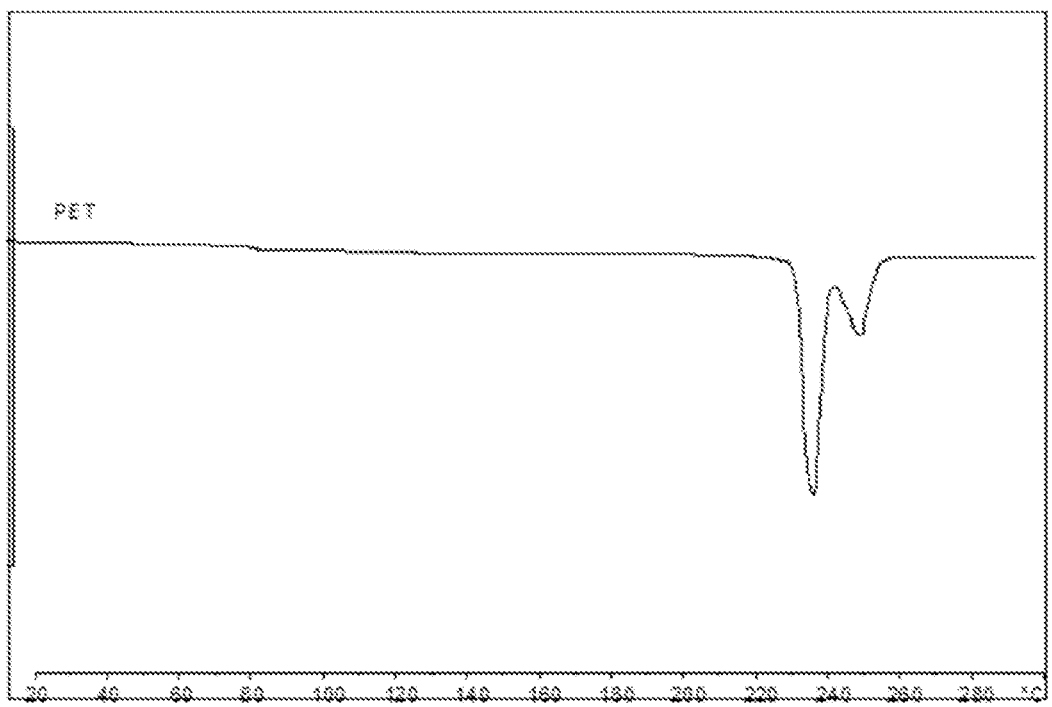
Figure 4C:
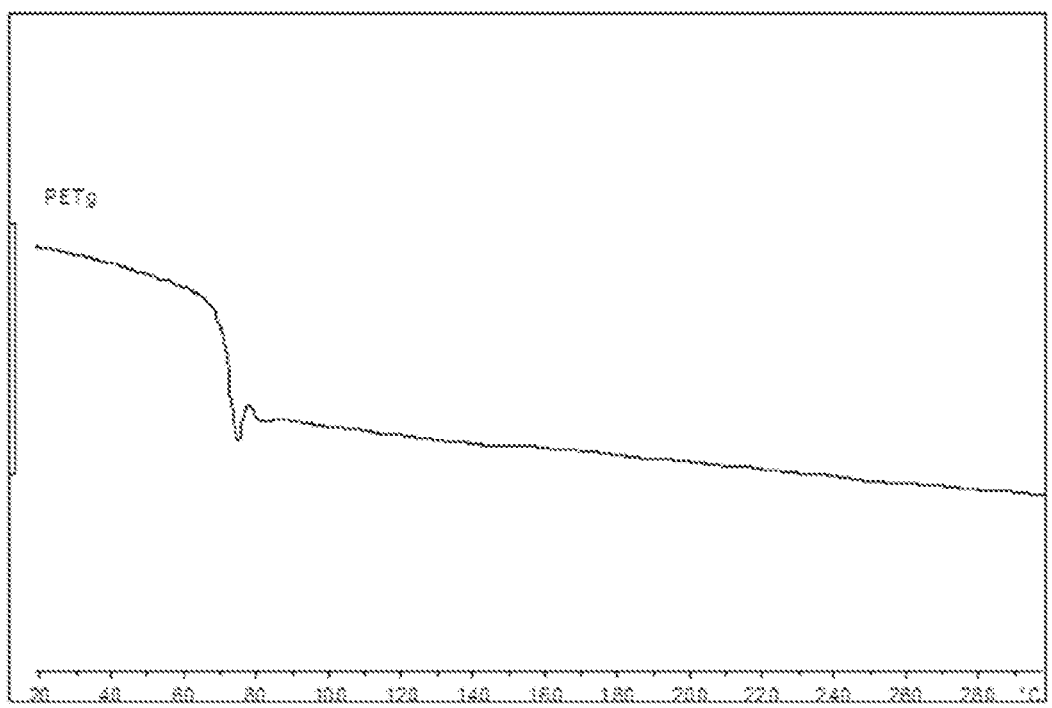

In FIGS. 4a to 4c examples are given of the thermal analysis tests as described herein above that enable to determine whether a polymer is crystallisable in the context of this invention.

FIGS. 4a-4c below show differential scanning calorimeter (DSC) thermograms of various polymer resins. A DSC thermogram is a plot of heat flow versus temperature. In the present graphs, the positive y-axis corresponds to the exothermic heat flow ("exo up" representation), which means that endothermic (melting) peaks are observed as peaks pointing downward. The DSC thermograms were obtained by heating a 5-20 mg sample of the as-received polymer resin material from 0 to 300° C. in a Mettler Toledo DSC821e instrument at a heating rate of 10° C./min. Both the PBT (FIG. 4a) and PET (FIG. 4b) resins exhibit one or more endothermic (melting) peaks in the temperature range from 180 to 280° C., whereas PETg (FIG. 4c) does not exhibit any peak in this temperature range. As described above the presumption is that if a melting peak is observed, then there was a crystalline phase, and if there is a crystalline phase, then the polymer is crystallisable (see FIG. 4a-4c for examples). So in the context of this invention the PETG is marked non-crystallisable and the PBT and PET are crystallisable.

The invention claimed is:
1. A polymer film for laminating onto a packaging steel substrate, the polymer film comprising an adhesion layer and a bulk layer,
   wherein the adhesion layer is intended for bonding to the metal substrate and comprises:
      20 to 50 wt. % of a non-crystallisable copolyester comprising polyethylene terephthalate modified by copolymerization,
      50 to 80 wt. % of polybutylene terephthalate (PBT) and 0-10 wt. % of polymers and additives, and
   wherein the bulk layer consists of at least 91 wt. % of PBT and at most 9% of other polymers and additives,
   wherein the non-crystallisable polyester is added only to the adhesion layer contacting the metal substrate,
   wherein the adhesion layer has an absence of polyethylene terephthalate (PET) homopolymer,
   further comprising a top layer on top of the bulk layer,
   wherein the top layer consists of at least 95 wt. % of PBT, and at most 5% of other polymers and additives,
   wherein the polymer film is machine direction oriented, transverse direction oriented, or biaxially oriented.
2. The polymer film according to claim 1, wherein the bulk layer consists of at least 95 wt. % of PBT, and at most 5% of other polymers and additives.

3. The polymer film according to claim 1, wherein the bulk layer consists of at least 99 wt. % of PBT, and at most 1% of other polymers and additives.

4. The polymer film according to claim 1, wherein the total PBT content in the film is at least 88 wt. %.

5. The polymer film according to claim 1, wherein the total PBT content in the film is at most 98 wt. %.

6. The polymer film according to claim 1, wherein the thickness of the adhesion layer is between 2 and 8 µm.

7. The polymer film according to claim 1, wherein the total film thickness is between 10 and 50 µm.

8. The polymer film according to claim 1, wherein the non-crystallisable polyester is polyethylene terephthalate glycol-modified (PETg).

9. The polymer film according to claim 1, wherein the non-crystallisable polyester is polyethylene terephthalate isophthalic acid-modified (IPA-PET).

10. The polymer film according to claim 1, further comprising one or more polymer layers in addition to the top, bulk and adhesion layer.

11. A laminate comprising the polymer film according to claim 1 and a metal substrate,
wherein the polymer film is laminated onto the metal substrate by (i) laminating the polymer film, wherein the polymer film has been stretched, onto the metal substrate by passing the metal substrate and the polymer film through a laminating device and heat bonding the polymer film to the metal substrate to produce a polymer-coated substrate followed by post-heating the polymer-coated substrate to reduce the orientation and crystallinity of the polymer film, and subsequently cooling the post-heated polymer-coated substrate or by (ii) direct extrusion onto the metal substrate followed by cooling the polymer-coated substrate.

12. The polymer film according to claim 1, wherein the total PBT content in the film is at least 90 wt. %.

13. The polymer film according to claim 1, wherein the total PBT content in the film is at most 96 wt. %.

14. The polymer film according to claim 1, wherein the non-crystallisable copolyester is polyethylene terephthalate modified by copolymerization selected from at least one member from the group consisting of polyethylene terephthalate glycol-modified and polyethylene terephthalate isophthalic acid-modified.

15. A process for producing a polymer film according to claim 1, comprising the steps of:
melting a suitable mixture of polymer granules in two or more extruders;
passing the molten polymer through a flat extrusion die to form the polymer film consisting of the said two or more layers;
cooling the extruded polymer film using one or more cooling, casting or calendering rolls to form a solid polymer film;
trimming the edges of the extruded polymer film;
reducing the thickness of the solid polymer film by stretching the solid polymer film in a stretching unit by exerting a stretching force only in the longitudinal direction (MDO), or only in the transverse direction (TDO), or biaxially (BO);
optionally trimming the edges of the stretched polymer film;
optionally coiling the stretched polymer film.

16. A method of use of the polymer film according to claim 1 and a metal substrate, comprising laminating the polymer film onto the metal substrate
by (i) laminating the polymer film, wherein the polymer film has been stretched, onto the metal substrate by passing the metal substrate and the polymer film through a laminating device and heat bonding the polymer film to the metal substrate to produce a polymer-coated substrate followed by post-heating the polymer-coated substrate to reduce the orientation and crystallinity of the polymer film, and subsequently cooling the post-heated polymer-coated substrate or
by (ii) direct extrusion onto the metal substrate followed by cooling the polymer-coated substrate.

17. A polymer film for laminating onto a packaging steel substrate, the polymer film comprising an adhesion layer and a bulk layer,
wherein the adhesion layer is intended for bonding to the metal substrate and comprises:
20 to 50 wt. % of a non-crystallisable copolyester comprising polyethylene terephthalate modified by copolymerization,
50 to 80 wt. % of polybutylene terephthalate (PBT) and 0-10 wt. % of polymers and additives, and
wherein the bulk layer consists of at least 91 wt. % of PBT and at most 9% of other polymers and additives,
wherein the non-crystallisable polyester is added only to the adhesion layer contacting the metal substrate,
wherein the adhesion layer has an absence of polyethylene terephthalate (PET) homopolymer,
further comprising a top layer on top of the bulk layer,
wherein the total PBT content in the film is at least 88 wt. % and wherein the top layer consists of at least 98 wt. % of PBT and at most 2% of other polymers and additives.

18. The polymer film according to claim 17, wherein the top layer consists of at least 99 wt. % of PBT, and at most 1% of other polymers and additives.

19. The polymer film according to claim 17, wherein the polymer film is machine direction oriented, transverse direction oriented, or biaxially oriented.

20. The polymer film according to claim 18, wherein the polymer film is machine direction oriented, transverse direction oriented, or biaxially oriented.

* * * * *